(12) United States Patent
Hiramoto et al.

(10) Patent No.: US 9,791,925 B2
(45) Date of Patent: Oct. 17, 2017

(54) INFORMATION ACQUISITION METHOD, INFORMATION ACQUISITION SYSTEM, AND NON-TRANSITORY RECORDING MEDIUM FOR USER OF MOTOR VEHICLE

(71) Applicant: Panasonic Intellectual Property Corporation of America, Torrance, CA (US)

(72) Inventors: Takuji Hiramoto, Osaka (JP); Kouji Miura, Osaka (JP); Satoru Takagishi, Osaka (JP); Natsuki Saeki, Osak (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 159 days.

(21) Appl. No.: 14/878,170

(22) Filed: Oct. 8, 2015

(65) Prior Publication Data

US 2016/0109944 A1    Apr. 21, 2016

Related U.S. Application Data

(60) Provisional application No. 62/064,171, filed on Oct. 15, 2014.

(30) Foreign Application Priority Data

Jul. 14, 2015   (JP) ................. 2015-140762

(51) Int. Cl.
*G06F 3/01*  (2006.01)
*G06F 3/16*  (2006.01)
(Continued)

(52) U.S. Cl.
CPC .............. *G06F 3/013* (2013.01); *G06F 3/017* (2013.01); *G06F 3/167* (2013.01); *G07C 5/085* (2013.01); *G10L 15/00* (2013.01); *G10L 25/78* (2013.01)

(58) Field of Classification Search
CPC .......... G06F 3/013; G06F 3/017; G06F 3/167; G06F 17/30241; G07C 5/00; G10L 25/78; G10L 15/00
See application file for complete search history.

(56) References Cited

U.S. PATENT DOCUMENTS

| 2004/0204851 A1* | 10/2004 | Fukuyasu .......... G01C 21/3629 701/487 |
| 2011/0301950 A1 | 12/2011 | Ouchi et al. |
| 2013/0304479 A1* | 11/2013 | Teller ..................... G06F 3/013 704/275 |

FOREIGN PATENT DOCUMENTS

WO    2010/106711    9/2010

* cited by examiner

*Primary Examiner* — Jerrah Edwards
*Assistant Examiner* — Kelly D Williams
(74) *Attorney, Agent, or Firm* — Greenblum & Bernstein, P.L.C.

(57) ABSTRACT

Provided is an information acquisition method in an information acquisition system including an information device possessed by a user. A detecting step detects a specific action performed by the user while driving a motor vehicle. A first saving step acquires and saves, in a storage unit, motor vehicle position information indicating a position of the motor vehicle if the specific action is detected by the detecting step. A deleting step deletes the motor vehicle position information from the storage unit in a case in which the specific action is an action other than an action of speaking a voice phrase, and when a designated time elapses in a case in which the user does not perform an action of speaking a voice phrase from a time at which the specific action was detected and before the designated time elapses.

13 Claims, 19 Drawing Sheets

(51) Int. Cl.
*G07C 5/08* (2006.01)
*G10L 15/00* (2013.01)
*G10L 25/78* (2013.01)

FIG. 6
600

| ITEM | | | EXAMPLE |
|---|---|---|---|
| TRANSACTION ID | | | 002 |
| MOBILE APPARATUS ID | | | D0000-0001-0002-0003 |
| CAR CONTROL SYSTEM ID | | | C9999-0001-0002-0003 |
| ASSOCIATED INFORMATION | | | VideoClip-00000001000200003-20141009123340.mpg |
| SENSOR DATA | TIME | | 10/9/2014 12:33:40 GMT |
| | POSITION INFORMATION | GPS INFORMATION | 34.83,135.57,10.0 |
| | | DIRECTION (°) | 120.0 |
| | | SPEED (km/h) | 60.0 |
| | GAZE INFORMATION | DIRECTION (°) | 100 |
| | | HEIGHT (°) | 30 |
| SPEECH DATA | LANGUAGE | | JAPANESE |
| | VOICE DATA | | VOICE DATA |

| CONTROL CONTENT | SPEECH |
|---|---|
| SAVE CLIP INFORMATION | "CLIP", "clip", "NOTE", "note", "SAVE", "save", … |
| SEARCH FOR PLACE | "WHAT", "TELL ME", "LOOK UP", "INVESTIGATE", … |
| ⋮ | ⋮ |

FIG. 9
900

| ITEM | | EXAMPLE |
|---|---|---|
| TRANSACTION ID | | 002 |
| CONTROL | CONTROL COMMAND | TEXT-TO-SPEECH |
| | CONTROL DATA | "GOT IT" |

901 — TRANSACTION ID
902 — CONTROL
911 — CONTROL COMMAND
912 — CONTROL DATA

FIG. 13
1300

| STORED ITEM | | | VALUE |
|---|---|---|---|
| CLIP ID | | | 00000000100020003-201410091233340 |
| MOBILE APPARATUS ID | | | D0000-0001-0002-0003 |
| CAR CONTROL SYSTEM ID | | | C9999-0001-0002-0003 |
| USER SPEECH | LANGUAGE | | JAPANESE |
| | STRING | | NOTE THE RESTAURANT ON THE LEFT |
| PLACE INFORMATION | GPS INFORMATION | LATITUDE (°) | 34.83 |
| | | LONGITUDE (°) | 135.57 |
| | | ALTITUDE (m) | 10.0 |
| | DIRECTION (°) | | 120.0 |
| | SPEED (km/h) | | 60.0 |
| | GAZE INFORMATION | DIRECTION (°) | 100 |
| | | HEIGHT (°) | 30 |
| | TIME | | 10/9/2014 12:33:40 GMT |
| | PLACE CATEGORY | | RESTAURANT |
| | PLACE NAME | | ITALIAN RESTAURANT "ITALIA" |
| | | | STEAK HOUSE "COW" |
| | ASSOCIATED INFORMATION | TYPE | VIDEO |
| | | DATA NAME | VideoClip-00000000100020003-201410091233340.mpg |

1301 STORED ITEM
1302 CLIP ID
1303 MOBILE APPARATUS ID / CAR CONTROL SYSTEM ID
1304 USER SPEECH
1311 PLACE INFORMATION / GPS INFORMATION
1305 PLACE INFORMATION
1312 DIRECTION
1313 SPEED
1314 GAZE INFORMATION
1315 TIME
1316 PLACE CATEGORY
1317 PLACE NAME
1318 ASSOCIATED INFORMATION

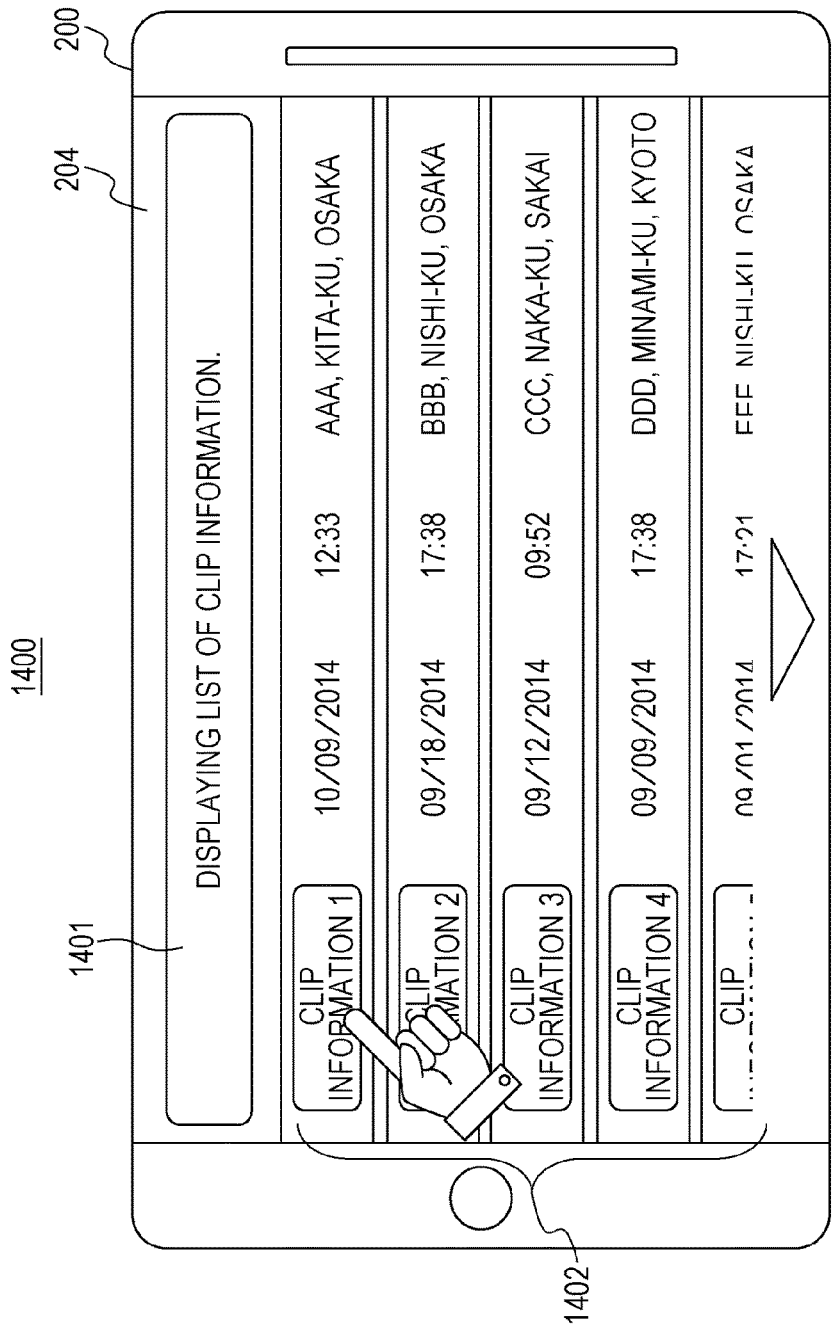

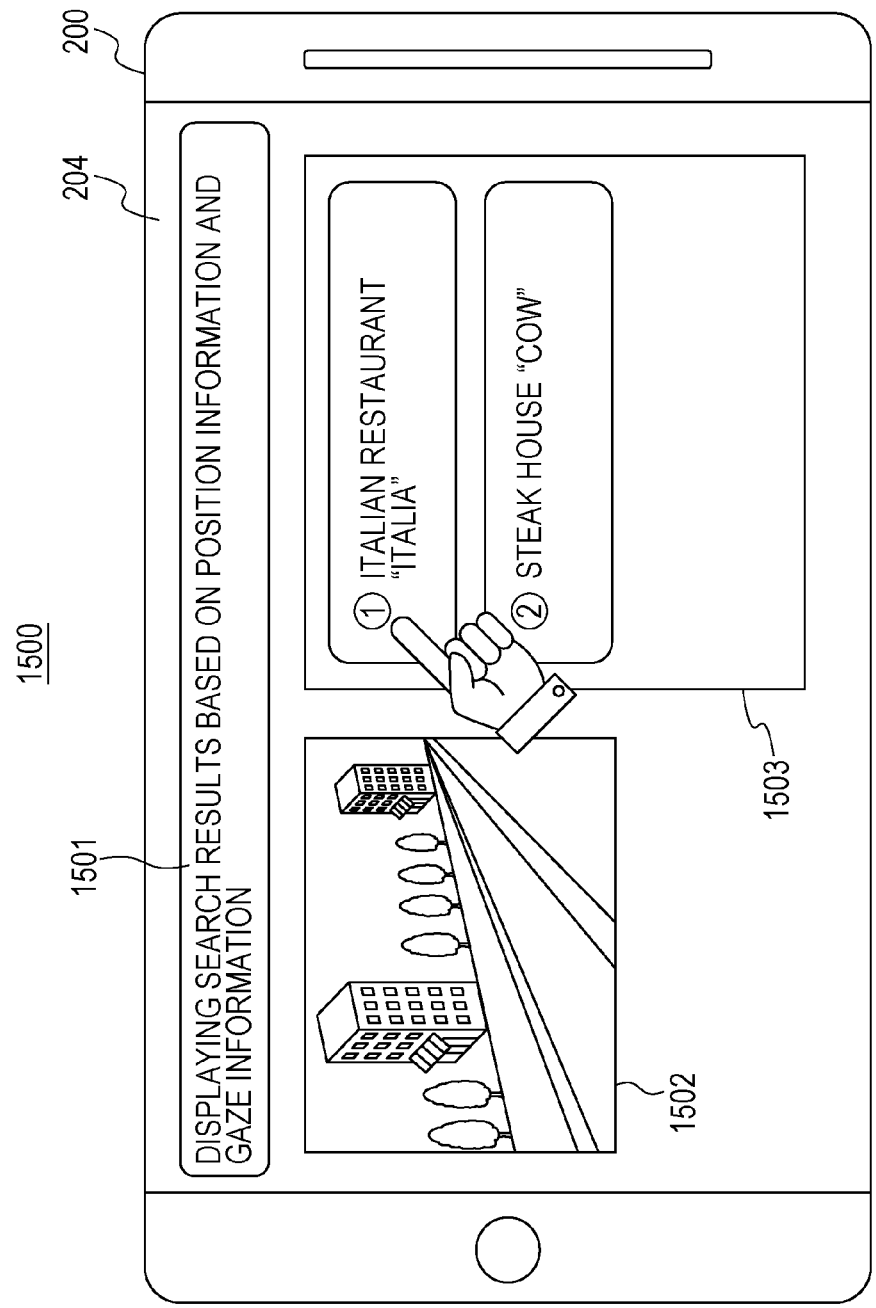

INFORMATION ACQUISITION METHOD, INFORMATION ACQUISITION SYSTEM, AND NON-TRANSITORY RECORDING MEDIUM FOR USER OF MOTOR VEHICLE

BACKGROUND

1. Technical Field

The present disclosure relates to an information acquisition method, an information acquisition system, and an information acquisition program.

2. Description of the Related Art

In the related art, the technology described in International Publication No. 2010/106711 is known as a voice recognition technology that recognizes a user's voice. The voice input device described in International Publication No. 2010/106711 is equipped with a voice input unit that converts a user's voice into a voice signal, an angle detector that detects the angle of the voice input unit, a distance detector that detects the distance between the voice input unit and the user, and a voice input switcher that controls the voice input unit on-off, based on the detected angle and distance. According to this configuration, on-off control of voice input is realized accurately, and as a result, improved accuracy of voice recognition is made possible.

SUMMARY

However, International Publication No. 2010/106711 requires further improvement.

In one general aspect, the techniques disclosed here feature an information acquisition method in an information acquisition system including an information device possessed by a user, the information acquisition method including: a detecting step of detecting a specific action performed by the user while driving a motor vehicle; a first saving step of acquiring and saving, in a non-transitory recording medium, motor vehicle position information indicating a position of the motor vehicle if the specific action is detected by the detecting step; and a deleting step of deleting the motor vehicle position information from the non-transitory recording medium in a case in which the specific action is an action other than an action of speaking a voice phrase, and when a designated time elapses in a case in which the user does not perform an action of speaking a voice phrase from a time at which the specific action was detected and before the designated time elapses.

According to the above aspect, further improvements in an information acquisition method may be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram schematically illustrating an example of a data structure of a voice processing request signal transmitted from a controller of a smartphone to a cloud center;

FIG. 8 is a diagram schematically illustrating an example of a specific voice phrase correspondence table, which is saved in a voice control DB and which includes a list of voice phrases stipulated in correspondence with control content;

FIG. 9 is a diagram schematically illustrating a response table stipulating response content corresponding to a control command;

FIG. 13 is a diagram schematically illustrating an example of a data structure of clip information saved in a clip information DB;

FIG. 14 is a diagram schematically illustrating an example of a clip information list screen displayed on a touch panel display of a smartphone;

FIG. 15 is a diagram schematically illustrating an example of a search results screen displayed on a touch panel display of a smartphone;

Figure 1:
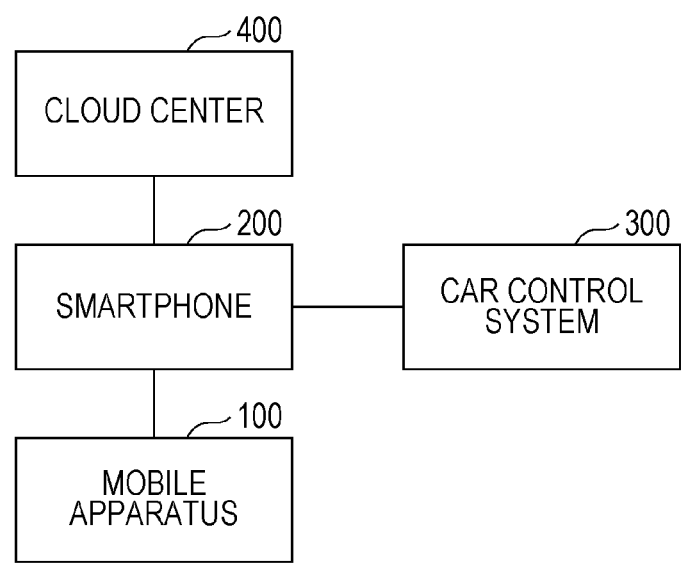
FIG. 1 is a block diagram illustrating a configuration of an information acquisition system according to an embodiment.

DETAILED DESCRIPTION (Underlying Knowledge Forming Basis of the Present Disclosure)

First, a focus of an aspect according to the present disclosure will be described.

While a car is traveling, a user may notice a place along the roadside, but since the user is driving, it may be difficult to operate an apparatus to acquire information about that place. Also, even if the user attempts to search for the place after driving, accurately searching for the place is difficult when the user's memory of the location or landscape is vague.

Accordingly, it is conceivable to use the voice recognition technology described in International Publication No. 2010/

106711, store position information expressing the position of the car on the basis of a voice instruction by the user, such as "Check", for example, search for a place corresponding to that position, and present a result to the user.

In this case, a voice recognition process is started from the time at which the user notices the place along the roadside and says "Check", and if there is obtained a result of the voice recognition process indicating that the spoken voice phrase was "Check", that is, the command to store position information, then position information is stored. However, since it takes a certain degree of time from the start until the end of the voice recognition process, when the car has a fast speed of travel, there is a possibility that the stored position information does not express the user's intended position.

For example, if the car is traveling at 80 km/h, and 1.5 seconds elapse between the time at which the user speaks the voice instruction "Check" until a result of the voice recognition process is obtained, there is a difference of approximately 33 m.

Also, when the user notices a place along the roadside, the user conceivably may perform another action before speaking. In this case, the position at which the user performed the other action may be closer to the position of the place than the position at which the user spoke.

To solve the above issues, the inventor arrived at the invention according to the following aspects. One aspect of the present disclosure is an information acquisition method in an information acquisition system including an information device possessed by a user, the information acquisition method including: a detecting step of detecting a specific action performed by the user while driving a motor vehicle; a first saving step of acquiring and saving, in a storage unit, motor vehicle position information indicating a position of the motor vehicle if the specific action is detected by the detecting step; and a deleting step of deleting the motor vehicle position information from the storage unit in a case in which the specific action is an action other than an action of speaking a voice phrase, and when a designated time elapses in a case in which the user does not perform an action of speaking a voice phrase from a time at which the specific action was detected and before the designated time elapses.

In this aspect, if a specific action performed by the user is detected, motor vehicle position information is acquired and saved in a storage unit. In other words, motor vehicle position information is saved in the storage unit simply as a result of the user performing the specific action, without conducting a voice recognition process. Consequently, according to this aspect, the motor vehicle position information desired by the user may be saved in the storage unit, even if the motor vehicle is traveling at high speed.

Also, in this aspect, the motor vehicle position information is deleted from the storage unit in a case in which the specific action performed by the user is an action other than an action of speaking a voice phrase, and when a designated time elapses in a case in which the user does not perform an action of speaking a voice phrase from a time at which the specific action was detected and before the designated time elapses. In a case in which the user does not speak a voice phrase giving some kind of instruction related to the motor vehicle position information, the motor vehicle position information saved in the storage unit is considered to be unwanted. Consequently, according to this aspect, it is possible to prevent the capacity of the storage unit from being occupied by unwanted motor vehicle position information.

Note that in this aspect, the state of motor vehicle position information being saved in the storage unit is maintained in a case in which the specific action is an action of speaking a voice phrase. Also, the state of motor vehicle position information being saved in the storage unit is maintained in a case in which the specific action is an action other than an action of speaking a voice phrase, but the user performs an action of speaking a voice phrase from the time at which the specific action is detected and before a designated time elapses.

In the above aspect, for example, the detecting step may detect gaze information related to a gaze direction of the user, and detect an action of the user moving his or her gaze by a designated angle or more as the specific action.

In this aspect, an action of the user moving his or her gaze by a designated angle or more is detected as the specific action. Consequently, according to this aspect, when the user notices a place on the roadside while traveling in a motor vehicle, for example, motor vehicle position information may be saved by the user simply performing an action of moving his or her gaze by the designated angle or more.

In the above aspect, for example, the saving step may save the motor vehicle position information and the gaze information in association with each other in the storage unit, and the deleting step may also delete the gaze information in a case of deleting the motor vehicle position information from the storage unit.

In this aspect, the motor vehicle position information is saved in association with the gaze information in the storage unit. For this reason, according to this aspect, when conducting a map search using the motor vehicle position information, for example, usage of the gaze information becomes possible. Also, when the motor vehicle position information is deleted from the storage unit, the gaze information is also deleted. For this reason, it is possible to prevent the capacity of the storage unit from being occupied by unwanted gaze information.

In the above aspect, for example, the detecting step may detect an action of the user moving his or her arm at a speed or an acceleration of a designated value or more as the specific action.

In this aspect, an action of the user moving his or her arm at a speed or an acceleration of a designated value or more is detected as the specific action. Consequently, according to this aspect, when the user notices a place on the roadside while traveling in a motor vehicle, for example, motor vehicle position information may be saved by the user simply performing an action of moving his or her arm at a speed or an acceleration of the designated value or more.

In the above aspect, for example, the detecting step may detect an action of the user stepping on a brake pedal of the motor vehicle by a designated value or more as the specific action.

In this aspect, an action of the user stepping on the brake pedal of the motor vehicle by a designated value or more is detected as the specific action. Consequently, according to this aspect, when the user notices a place on the roadside while traveling in a motor vehicle, for example, motor vehicle position information may be saved by the user simply performing an action of stepping on the brake pedal of the motor vehicle by the designated value or more.

In the above aspect, for example, the detecting step may detect an action of the user speaking a voice phrase as the specific action.

In this aspect, an action of the user speaking a voice phrase is detected as the specific action. Consequently, according to this aspect, when the user notices a place on the roadside while traveling in a motor vehicle, for example, motor vehicle position information may be saved by the user simply performing an action of speaking a voice phrase.

In the above aspect, for example, the information acquisition system additionally may include a server device, the server device may include a search function that uses map information to search for information related to a place, and a voice recognition function that recognizes content of a voice phrase spoken by the user, the information device may communicate with the server device, and the information acquisition method additionally may include a voice recognizing step of recognizing content of a voice phrase spoken by the user in a case in which the specific action is an action of speaking a voice phrase, or a case in which the specific action is an action other than an action of speaking a voice phrase, but the user performs an action of speaking a voice phrase from a time at which the specific action was detected and before the designated time elapses; and a searching step of using the map information to search for information related to a place established in a vicinity of a position corresponding to the motor vehicle position information saved in the storage unit if the voice recognizing step judges that the voice phrase spoken by the user includes a specific search-related voice phrase.

In this aspect, content of a voice phrase spoken by the user is recognize in a case in which the specific action is an action of speaking a voice phrase, or a case in which the specific action is an action other than an action of speaking a voice phrase, but the user performs an action of speaking a voice phrase from a time at which the specific action was detected and before the designated time elapses. If, as a result of such voice recognition, the voice phrase spoken by the user is judged to include a specific search-related voice phrase, the map information is used to search for information related to a place established in a vicinity of a position corresponding to the motor vehicle position information saved in the storage unit. Consequently, according to this aspect, it is possible to search for information related to a place established in the vicinity of a position corresponding to the motor vehicle position information desired by the user.

In the above aspect, for example, the information acquisition method additionally may include a second saving step of generating and saving, in the server device, clip information including the motor vehicle position information and the information related to a place found by the searching step if the voice recognizing step judges that the voice phrase spoken by the user includes a specific save-related voice phrase.

In this aspect, if the voice phrase spoken by the user is judged to include a specific save-related voice phrase, the found information related to a place and the motor vehicle position information are saved in association with each other in the server device. Consequently, according to this aspect, it is possible to save information related to a place at a position corresponding to the motor vehicle position information desired by the user.

In the above aspect, for example, the deleting step may delete the motor vehicle position information saved in the storage unit from the storage unit if the voice recognizing step judges that the voice phrase spoken by the user includes neither the specific search-related voice phrase nor the specific save-related voice phrase.

In this aspect, the motor vehicle position information is deleted from the storage unit if the voice phrase spoken by the user is judged to include neither the specific search-related voice phrase nor the specific save-related voice phrase. In a case in which the voice phrase spoken by the user includes neither the specific search-related voice phrase nor the specific save-related voice phrase, the motor vehicle position information saved in the storage unit is considered to be unwanted. Consequently, according to this aspect, it is possible to prevent the capacity of the storage unit from being occupied by unwanted motor vehicle position information.

Another aspect of the present disclosure includes a storage unit for storing information; a sensor detecting a specific action performed by a user while driving a motor vehicle; a saving controller that acquires and saves, in the storage unit, motor vehicle position information indicating a position of the motor vehicle if the specific action is detected by the sensor; and a deletion controller that deletes the motor vehicle position information from the storage unit in a case in which the specific action is an action other than an action of speaking a voice phrase, and when a designated time elapses in a case in which the user does not perform an action of speaking a voice phrase from a time at which the specific action was detected and before the designated time elapses.

Yet another aspect of the present disclosure is an information acquisition computer program used in an information acquisition system including an information device possessed by a user, the information acquisition computer program causing a computer of the information acquisition system to execute: a detecting process of detecting a specific action performed by the user while driving a motor vehicle; a saving process of acquiring and saving, in a storage unit, motor vehicle position information indicating a position of the motor vehicle if the specific action is detected by the detecting process; and a deleting process of deleting the motor vehicle position information from the storage unit in a case in which the specific action is an action other than an action of speaking a voice phrase, and when a designated time elapses in a case in which the user does not perform an action of speaking a voice phrase from a time at which the specific action was detected and before the designated time elapses.

Embodiment

Hereinafter, an embodiment of the present disclosure will be described with reference to the drawings. Note that in the drawings, like signs are used to denote like structural elements.

(Configuration of Information Acquisition System)

Figure 2:
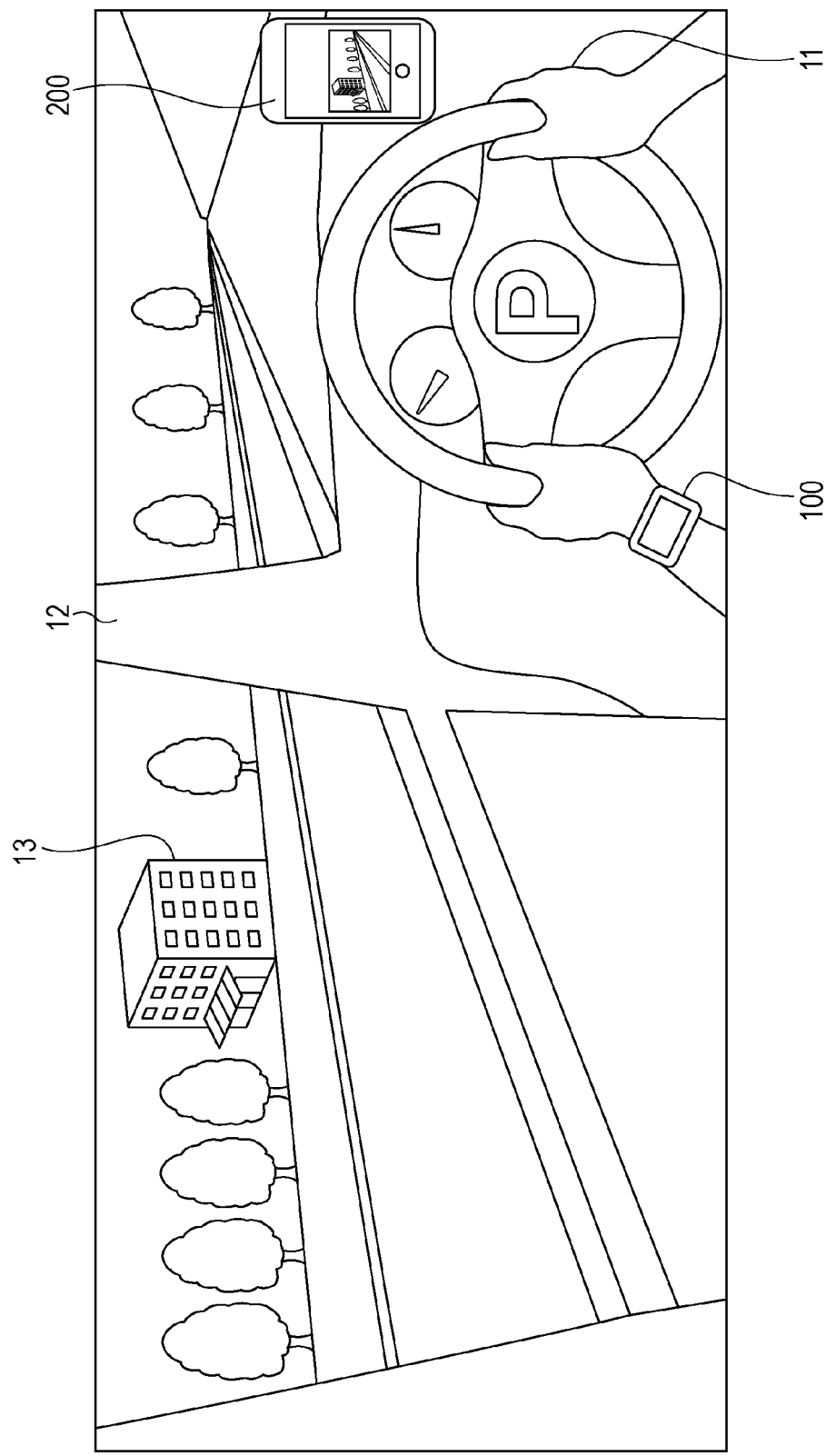
FIG. 2 is a diagram schematically illustrating a situation in which an information acquisition system according to an embodiment is used.

FIG. 1 is a block diagram illustrating a configuration of an information acquisition system 1 according to an embodiment. FIG. 2 is a diagram schematically illustrating a situation in which an information acquisition system 1 according to an embodiment is used.

As illustrated in FIG. 1, the information acquisition system 1 of the present embodiment is equipped with a mobile apparatus 100, a smartphone 200, a car control system 300, and a cloud center 400.

Note that although the information acquisition system 1 is equipped with the mobile apparatus 100 and the smartphone 200 in FIG. 1, the present disclosure is not limited to this configuration. As an alternative, the information acquisition system 1 may also be equipped with an apparatus unifying the mobile apparatus 100 and the smartphone 200, such as a car navigation system, for example. As another alternative, instead of the mobile apparatus 100 and the smartphone 200, the information acquisition system 1 may be equipped with a car navigation system equipped with only the functions provided in the smartphone 200.

In FIG. 2, a user 11 of the mobile apparatus 100 and the smartphone 200 is driving a car (motor vehicle) 12. The user 11 performs a specific action when a place 13 of interest enters into the field of view of the user 11 from the traveling car 12. Subsequently, the information acquisition system 1 temporarily saves position information at the time at which the user 11 performed the specific action.

After that, if the user 11 speaks a specific search-related voice phrase within a designated time, the information acquisition system 1 searches for the place 13 on the basis of the position information. If the user 11 desires, the information acquisition system 1 may save search results for viewing after the end of driving or the like.

Note that the specific action will be discussed in detail later. Also, while driving the car 12, the field of view of the user 11 narrows depending on the speed of travel. For this reason, the information acquisition system 1 controls the search range based on the position information and the movement speed.

Figure 3:
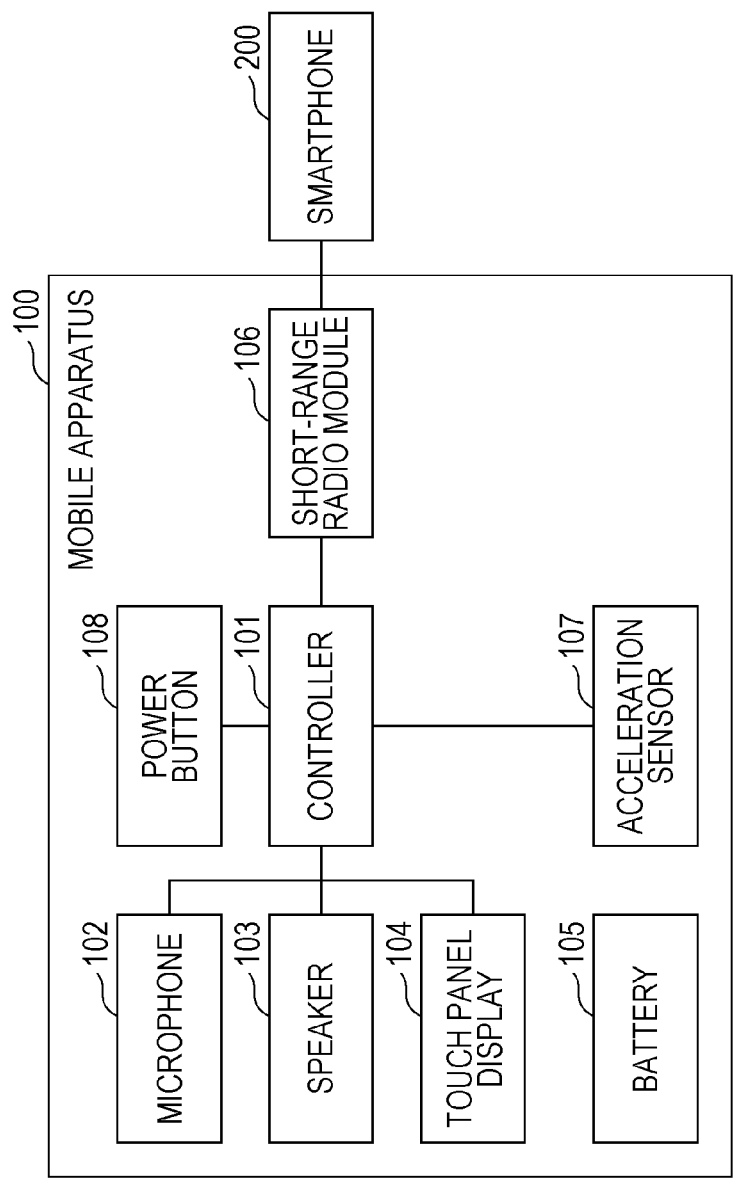
FIG. 3 is a block diagram schematically illustrating a configuration of a mobile apparatus.

FIG. 3 is a block diagram schematically illustrating a configuration of the mobile apparatus 100. In the present embodiment, the mobile apparatus 100 is a wristwatch-style wearable terminal, as illustrated in FIG. 2.

The mobile apparatus 100 is equipped with a controller 101, a microphone 102, a speaker 103, a touch panel display 104, a battery 105, a short-range radio module 106, an acceleration sensor 107, and a power button 108.

When the power button 108 is pressed, power is supplied to each component from the battery 105. The microphone 102 picks up the voice of the user 11 to generate an analog voice signal. The microphone 102 converts the generated analog voice signal into digital data by pulse code modulation (PCM), for example, and generates a PCM voice signal. The microphone 102 outputs the generated PCM voice signal to the controller 101.

The controller 101 controls the operation of each component. For example, the controller 101 outputs from the speaker 103 a response to the input voice of the user 11, for example. In the present embodiment, the touch panel display 104 includes a liquid crystal panel, for example.

The short-range radio module 106 conducts short-range radio communication with the smartphone 200. The short-range radio module 106 may also conform to a wireless LAN standard, for example. The short-range radio module 106 may also conform to various wireless LAN methods, such as a method that uses radio waves in the 2.4 GHz band, for example. It is sufficient for the short-range radio module 106 to be able to conduct short-range radio communication with the smartphone 200.

The acceleration sensor 107 detects acceleration when the user 11 wearing the mobile apparatus 100 on his or her wrist moves his or her arm. The acceleration sensor 107 outputs the detected acceleration to the controller 101. While driving, if an acceleration equal to or greater than a designated value is detected by the acceleration sensor 107 (an example of a detector), the controller 101 (an example of a detector) judges that the specific action was performed by the user 11. The above designated value is predetermined to be an acceleration from which the user 11 is estimated to have performed a gesture of pointing at a place in the vicinity of the car 12. The controller 101 transmits an indication that the user 11 performed the specific action to the smartphone 200 via the short-range radio module 106.

Figure 4:
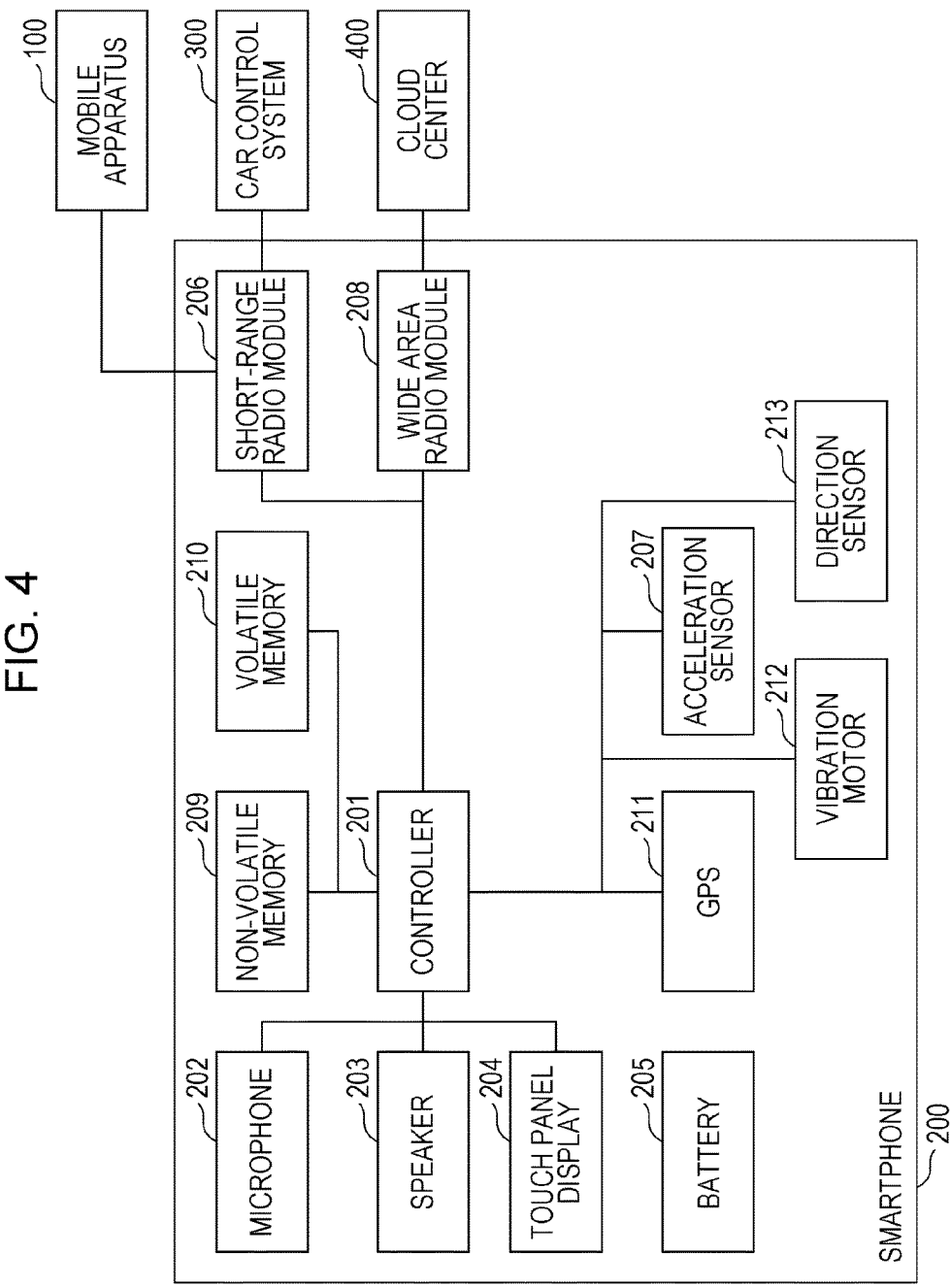
FIG. 4 is a block diagram schematically illustrating a configuration of a smartphone.

FIG. 4 is a block diagram schematically illustrating a configuration of the smartphone 200. The smartphone 200 (an example of an information device) is equipped with a controller 201, a microphone 202, a speaker 203, a touch panel display 204, a battery 205, a short-range radio module 206, an acceleration sensor 207, a wide area radio module 208, non-volatile memory 209, volatile memory 210, a Global Positioning System (GPS) module 211, a vibration motor 212, and a direction sensor 213.

The microphone 202, the speaker 203, the touch panel display 204, the battery 205, and the short-range radio module 206 are configured similarly to the microphone 102, the speaker 103, the touch panel display 104, the battery 105, and the short-range radio module 106 of the mobile apparatus 100 (FIG. 3).

The wide area radio module 208 communicates with the cloud center 400 via the Internet or a mobile phone network, for example. The non-volatile memory 209 includes flash memory, for example. The volatile memory 210 includes dynamic random access memory, for example. The GPS module 211 receives radio waves from satellites to acquire position information. The vibration motor 212 vibrates the casing of the smartphone 200 with the rotation of a motor. The direction sensor 213 detects the direction in which the top edge of the smartphone 200 is facing, for example.

The controller 201, upon receiving detection information transmitted from the controller 101 of the mobile apparatus 100 and indicating that the user 11 performed the specific action, uses the GPS module 211 to acquire position information from the time of reception.

The controller 201, after removing environmental sounds such as music or noise from the PCM voice signal input from the microphone 202, performs a fast Fourier transform (FFT). If, in the result of performing the FFT, the sound pressure in a designated frequency range exceeds a predetermined threshold, the controller 201 judges that the sound is voice produced by a person.

Figure 5:
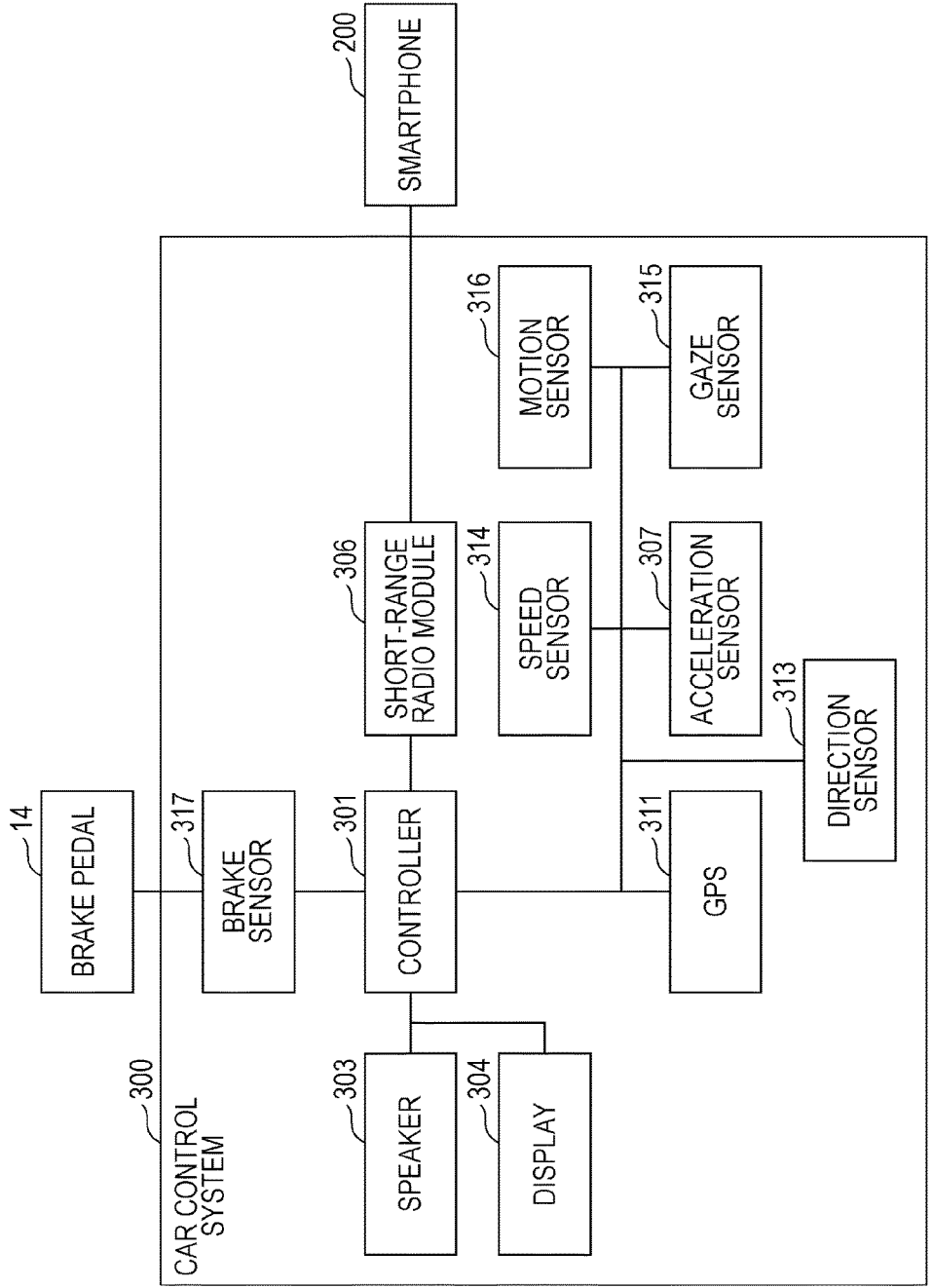
FIG. 5 is a block diagram schematically illustrating a configuration of a car control system.

FIG. 5 is a block diagram schematically illustrating a configuration of the car control system 300. The car control system 300 is equipped with a controller 301, a speaker 303, a display 304, a short-range radio module 306, an acceleration sensor 307, a GPS module 311, a direction sensor 313, a speed sensor 314, a gaze sensor 315, a motion sensor 316, and a brake sensor 317.

The speaker 303, the short-range radio module 306, and the acceleration sensor 307 are each configured similarly to the speaker 103, the short-range radio module 106, and the acceleration sensor 107 of the mobile apparatus 100 (FIG. 3). The GPS module 311 is configured similarly to the GPS module 211 of the smartphone 200. The direction sensor 313 detects the direction of travel of the car 12, using north as a reference, for example. The display 304 includes a liquid crystal panel, for example. The speed sensor 314 detects the speed of travel of the car 12.

The gaze sensor 315 (an example of a detector) takes an image of the driver's seat, performs image processing, and detects the direction in which the gaze (face) of the user 11 is facing and the angle in the height direction (angle of elevation). The gaze sensor 315 outputs, to the controller 301, the detected direction in which the face (gaze) of the user 11 is facing and the detected angle in the height direction.

The controller 301 judges whether or not the direction in which the gaze (face) of the user 11 is facing or the angle in the height direction has changed by a designated angle or more. The above designated angle is predetermined to be an angle from which the user 11 is estimated to express an interest in an object in the vicinity of the car 12. The controller 301 (an example of a detector), upon judging that the direction in which the gaze (face) of the user 11 is facing or the angle in the height direction has changed by a designated angle or more, judges that the user 11 performed the specific action.

The motion sensor 316 (an example of a detector) is a sensor that recognizes a gesture such as the position and motion of the user 11 who is the driver, and detects the motion of the arm of the user 11. The motion sensor 316 outputs the detected motion of the arm of the user 11 to the controller 301. The controller 301 (an example of a detector), upon judging that the arm of the user 11 has moved at a speed or an acceleration of a designated value or more, judges that the user 11 performed the specific action. The above designated value is predetermined to be a speed or an acceleration from which the user 11 is estimated to have performed a gesture of pointing at a place in the vicinity of the car 12.

The brake sensor 317 (an example of a detector) detects the depression of a brake pedal 14 stepped on by the user 11. The brake sensor 317 outputs the detected depression of the brake pedal 14 to the controller 301. The controller 301 (an example of a detector), upon judging that the depression of the brake pedal 14 is a designated value or more, judges that the user 11 performed the specific action. The above designated value is predetermined to be a depression from which the user 11 is estimated to express an interest in an object in the vicinity of the car 12.

The controller 301, upon judging that the user 11 performed the specific action, transmits to the controller 201 of the smartphone 200 detection information indicating that the user 11 performed the specific action.

In FIG. 4, the controller 201 of the smartphone 200, upon receiving an indication that the user 11 performed the specific action from the mobile apparatus 100 or the car control system 300, judges whether or not the user 11 spoke before a designated time elapsed since the time of reception. The above designated time is predetermined to be a time during which the speaking of a voice phrase related to the specific action is expected. In the present embodiment, the above designated time is 5 seconds, for example.

Upon judging that the user 11 spoke a voice phrase, the controller 201 transmits a voice processing request signal (discussed later) including the relevant voice signal and the position information from the time of reception to the cloud center 400 via the wide area radio module 208.

Additionally, when the controller 201 (an example of a detector) does not receive an indication that the user 11 performed the specific action from the mobile apparatus 100 or the car control system 300, but judges that the user 11 has spoken a voice phrase, the controller 201 uses the GPS module 211 to acquire position information from the time of judging that the user 11 spoke a voice phrase. The controller 201 transmits a voice processing request signal (discussed later) including the relevant voice signal and the position information from the time of judgment to the cloud center 400.

Note that although herein the controller 201 uses the GPS module 211 to acquire position information, the present disclosure is not limited thereto. The controller 201 may also acquire position information from the GPS module 311 of the car control system 300.

FIG. 6 is a diagram schematically illustrating an example of a data structure of a voice processing request signal 600 transmitted from the controller 201 of the smartphone 200 to the cloud center 400.

As illustrated in FIG. 6, the voice processing request signal 600 includes a transaction ID 601, a mobile apparatus ID 602, a car control system ID 603, associated information 604, sensor data 605, and speech data 606.

The transaction ID 601 is an identifier that identifies the voice processing request signal. The mobile apparatus ID 602 is an identifier that identifies the mobile apparatus 100. The car control system ID 603 is an identifier that identifies the car control system 300. The associated information 604 is a data name of video recorded by a drive recorder (not illustrated), for example.

The sensor data 605 includes a time 611, position information 612, and gaze information 613. The position information 612 includes GPS information 621, a direction 622, and a speed 623. The gaze information 613 includes a direction 624 and a height 625 of a gaze detected by the gaze sensor 315 of the car control system 300.

The time 611 indicates the date and time of day at which the controller 201 of the smartphone 200 acquired the GPS information 621 from the GPS module 211 or the GPS module 311.

The GPS information 621 includes a latitude, longitude, and altitude acquired by the GPS module 211 or the GPS module 311. The direction 622 indicates the direction of travel of the car 12 detected by the direction sensor 313 at the time 611. In the present embodiment, the direction 622 is expressed as a clockwise angle treating north as a reference of 0 degrees. The speed 623 indicates the speed of travel of the car 12 detected at the time 611 by the speed sensor 314 of the car control system 300.

The direction 624 is the direction when the gaze is projected onto the ground plane, and in the present embodiment, is expressed as a clockwise angle treating north as a reference of 0 degrees. The height 625 is expressed as an angle in the height direction (angle of elevation) with respect to the horizontal plane.

The speech data 606 includes a language 631 and voice data 632. In the present embodiment, the language 631 includes the data "Japanese". The voice data 632 includes the PCM voice signal discussed earlier, for example.

Figure 7:
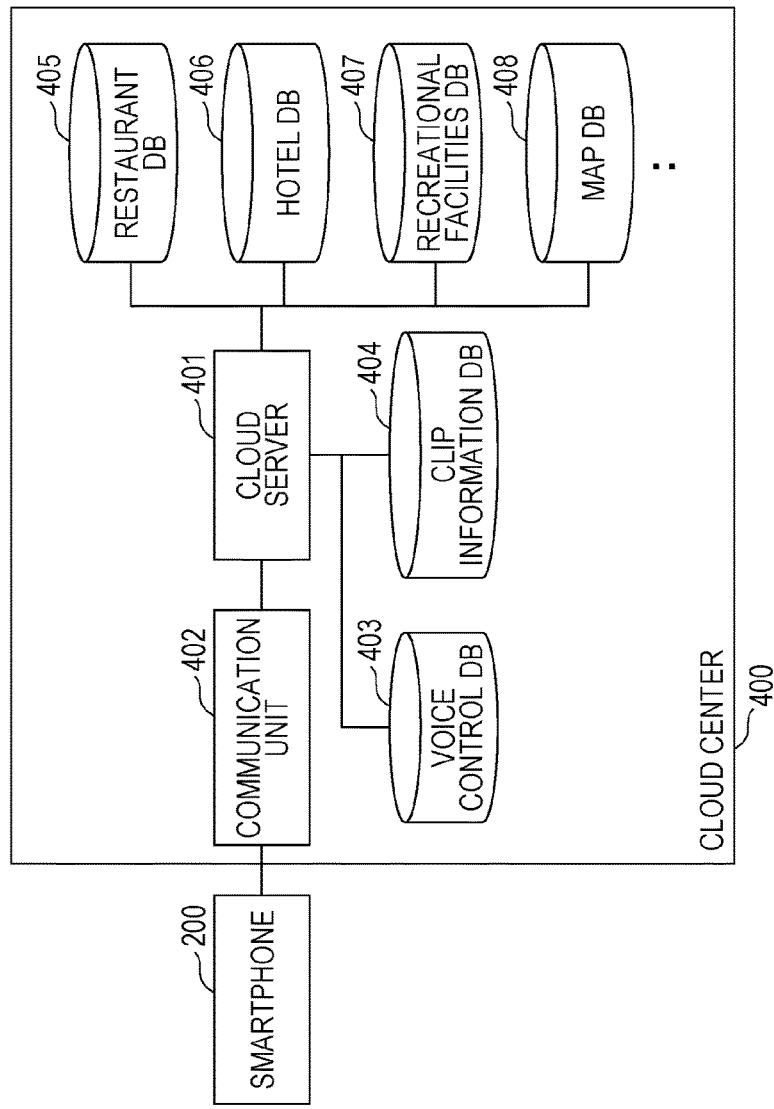
FIG. 7 is a block diagram schematically illustrating a configuration of a cloud center.

FIG. 7 is a block diagram schematically illustrating a configuration of the cloud center 400. The cloud center 400 is equipped with a cloud server 401 (an example of a server device), a communication unit 402, a voice control database (DB) 403, a clip information DB 404, a restaurant DB 405, a hotel DB 406, a recreational facilities DB 407, a map DB 408, and the like.

The communication unit 402 communicates with the smartphone 200 via the Internet or a mobile phone network, for example. In the restaurant DB 405, the hotel DB 406, and the recreational facilities DB 407, information including positions, phone numbers, and the like related to restaurants, hotels, and recreational facilities is saved, respectively. In the map DB 408, information related to maps is saved.

In the voice control DB 403, acoustic models, language models, and the like for voice recognition are saved. In the voice control DB 403, a specific voice phrase correspondence table including a list of voice phrases stipulated in correspondence with control content of the cloud server 401 is saved. In the voice control DB 403, response content of responses by the cloud server 401 corresponding to control commands is saved. In the voice control DB 403, scenarios stipulating response content with respect to the content of spoken voice phrases are saved.

FIG. 8 is a diagram schematically illustrating an example of a specific voice phrase correspondence table 800, which is saved in the voice control DB 403 and which includes a list of voice phrases stipulated in correspondence with control content.

As illustrated in FIG. 8, if the user 11 speaks a voice phrase such as "Clip", "Note", or "Save" (examples of a specific save-related voice phrase), for example, the cloud server 401 generates and saves clip information (discussed later) in the clip information DB 404. If the user 11 speaks a voice phrase such as "What", "Tell me", "Look up", or "Investigate" (examples of a specific search-related voice phrase), for example, the cloud server 401 uses the restaurant DB 405, hotel DB 406, recreational facilities DB 407, and map DB 408 to search for the category, name, and the like of a place.

FIG. 9 is a diagram schematically illustrating a response table 900 stipulating response content corresponding to a control command. As illustrated in FIG. 9, the response table 900 includes a transaction ID 901 and a control 902. The control 902 includes a control command 911 and control data 912. As described earlier, the transaction ID 901 is an identifier that identifies the voice processing request signal.

In the example of FIG. 9, with respect to the voice processing request signal 600 with the transaction ID "002" (FIG. 6), the cloud server 401 transmits a response having a control command 911 of "Text-to-speech" and control data 912 of "Got it" to the smartphone 200.

Next, the search range when the cloud server 401 searches for a place using the map DB 408 will be described with reference to FIGS. 10 to 12.

Figure 10:
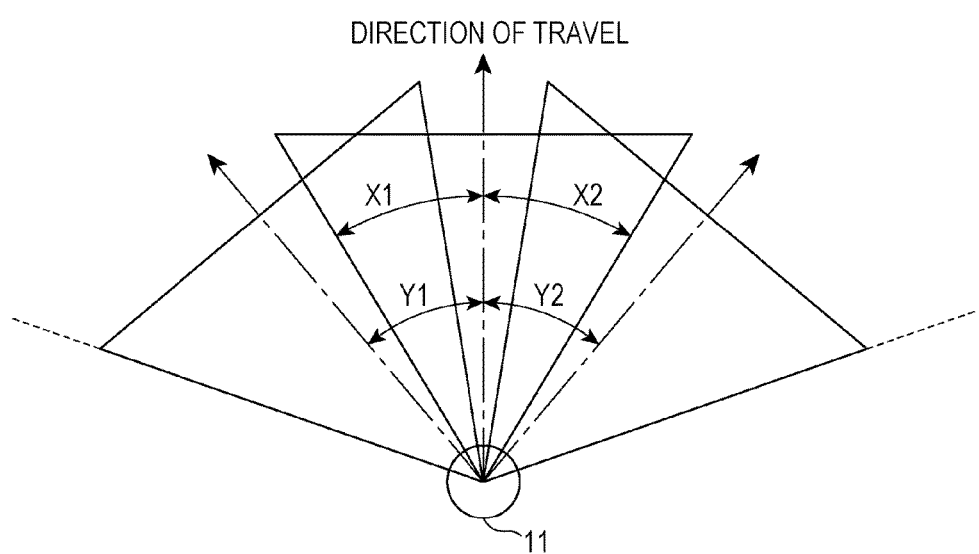
FIG. 10 is a diagram schematically illustrating a field of view range of a user facing in a car's direction of travel.

FIG. 10 is a diagram schematically illustrating a field of view range of the user 11 facing in the car's direction of travel. The angle X1 represents the angle from the gaze center to the left edge of the field of view. The angle X2 represents the angle from the gaze center to the right edge of the field of view. The angle Y1 represents the angle to the leftmost gaze direction in a sight range over which the user 11 who is the driver looks for a safety check during normal driving. The angle Y2 represents the angle to the rightmost gaze direction in the sight range over which the user 11 who is the driver looks for a safety check during normal driving.

Figure 11:
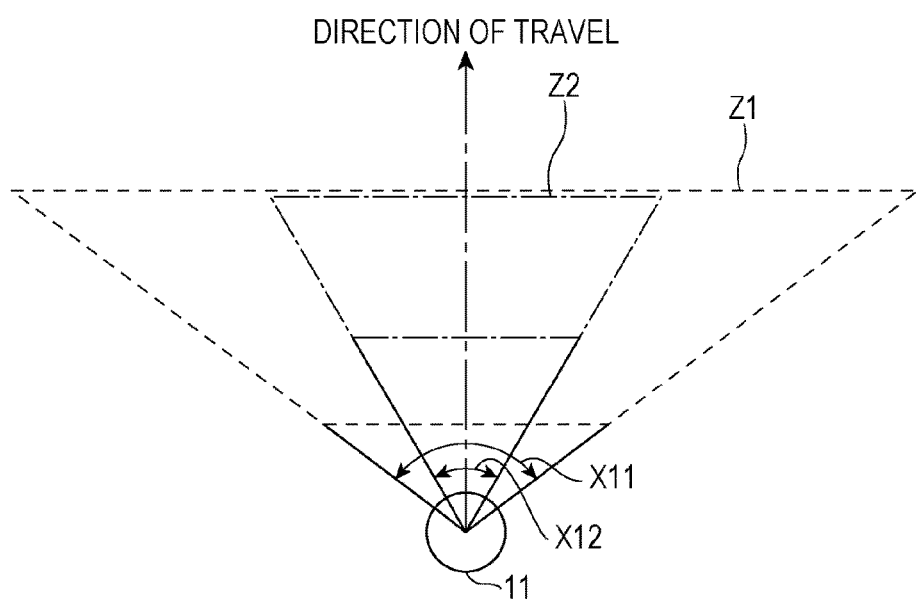
FIG. 11 is a diagram schematically illustrating search ranges depending on a car's speed of travel when the user is facing in the car's direction of travel.

FIG. 11 is a diagram schematically illustrating search ranges depending on the car's speed of travel when the user 11 is facing in the car's direction of travel. As illustrated in FIG. 11, the angular field of view X11 during low-speed driving is larger than the angular field of view X12 during high-speed driving. Accordingly, the search range Z2 during high-speed driving is made narrower than the search range Z2 during low-speed driving. In other words, the search range is refined as the car's speed of travel rises.

Figure 12:
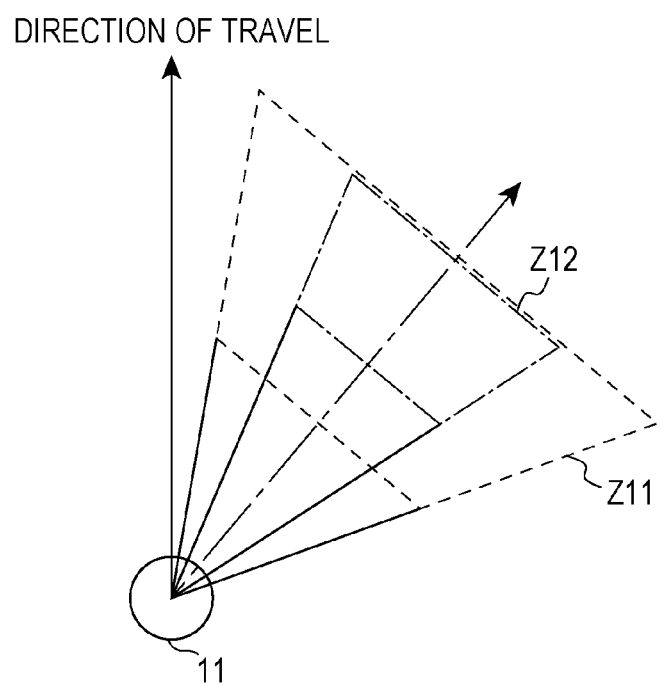
FIG. 12 is a diagram schematically illustrating search ranges depending on a car's speed of travel when the user is facing to the right of the car's direction of travel.

FIG. 12 is a diagram schematically illustrating search ranges depending on the car's speed of travel when the user 11 is facing to the right of the car's direction of travel. Gaze information detected by the gaze sensor 315 of the car control system 300 and including the direction and height of the gaze of the user 11 is included in the voice processing request signal 600 (FIG. 6). Also, the speed of travel of the car 12 detected by the speed sensor 314 of the car control system 300 is included in the voice processing request signal 600 (FIG. 6). As illustrated in FIG. 12, the cloud server 401 uses this gaze information and the speed of travel of the car 12 to decide a search range Z11 during low-speed driving and a search range Z12 during high-speed driving.

Returning to FIG. 7, the cloud server 401 generates clip information including the result of searching for the place. The cloud server 401 saves the generated clip information in the clip information DB 404.

FIG. 13 is a diagram schematically illustrating an example of a data structure of clip information 1300 saved in the clip information DB 404.

As illustrated in FIG. 13, the clip information 1300 includes a clip ID 1301, a mobile apparatus ID 1302, a car control system ID 1303, user speech 1304, and place information 1305.

The clip ID 1301 is an identifier that identifies the clip information. The mobile apparatus ID 1302, the car control system ID 1303, as well as the GPS information 1311, the direction 1312, the speed 1313, the gaze information 1314, and the time 1315 of the place information 1305 are the same as the mobile apparatus ID 602, the car control system ID 603, the GPS information 621, the direction 622, the speed 623, the gaze information 613, and the time 611 of the voice processing request signal 600, respectively.

The "Language" of the user speech 1304 is the same as the language 631 included in the voice processing request signal 600. The "String" of the user speech 1304 is text data extracted as a result of the cloud server 401 using the voice control DB 403 to perform a voice recognition process on the voice data 632 included in the voice processing request signal 600. FIG. 13 illustrates an example in which the user 11 spoke the voice phrase "Note the restaurant on the left".

The place category 1316 of the place information 1305 indicates the category of a found place 13 (FIG. 2), and the place name 1317 indicates the name of a found place 13 (FIG. 2). In the example of FIG. 13, two restaurants have been found by search.

The "Type" of the associated information 1318 of the place information 1305 indicates the type of information, and the "Data name" indicates the data name of the information. In the example of FIG. 13, information with the same data name as the associated information 604 of FIG. 6 is included.

FIG. 14 is a diagram schematically illustrating an example of a clip information list screen 1400 displayed on the touch panel display 204 of the smartphone 200.

The clip information list screen 1400 includes a title display area 1401 and a list display area 1402. In FIG. 14, "Displaying list of clip information" is displayed in the title display area 1401, thereby stating that this display screen is a clip information list screen. In the list display area 1402, clip information numbers are displayed respectively, together with the time and address at which the clip information was acquired.

While in the state of the clip information list screen 1400 being displayed on the touch panel display 204, if the user touches a clip information number in the list display area 1402 with a finger, for example, the controller 201 senses the touch. Subsequently, the controller 201 displays on the touch panel display 204 a search results screen 1500 (FIG. 15) of clip information 1300 corresponding to the touched clip information number.

FIG. 15 is a diagram schematically illustrating an example of a search results screen 1500 displayed on the touch panel display 204 of the smartphone 200.

The search results screen 1500 includes a title display area 1501, a video display area 1502, and a place display area 1503. In FIG. 15, "Displaying search results based on position information and gaze information" is displayed in the title display area 1501, thereby stating that this display screen is a search results screen.

In the video display area 1502, a video from when the position information was acquired is displayed. As illustrated in FIG. 13, when a video recorded by a drive recorder, for example, is included as associated information 1318 of the clip information 1300, the video is displayed in the video display area 1502.

In the place display area 1503, the names of places obtained by search are displayed. As discussed earlier, in the example of FIG. 13, the clip information 1300 includes two restaurants as the place name 1317. Consequently, in the place display area 1503 of FIG. 15, the names of two restaurants are displayed.

While in the state of the search results screen 1500 being displayed on the touch panel display 204, if the user touches a place name in the place display area 1503 with a finger, for example, the controller 201 senses the touch. Subsequently, the controller 201 may display on the touch panel display 204 detailed content for the touched place name.

Alternatively, while in the state of the search results screen 1500 including multiple places being displayed on the touch panel display 204, as illustrated in FIG. 15, if the user touches a place name in the place display area 1503 with a finger, for example, the controller 201 senses the touch. Subsequently, the controller 201 may transmit to the cloud server 401 an instruction to delete the touched place name from the clip information 1300. Conversely, the controller 201 may transmit to the cloud server 401 an instruction to leave only the touched place name in the clip information 1300.

(Operation of Information Acquisition System)

Figure 16:
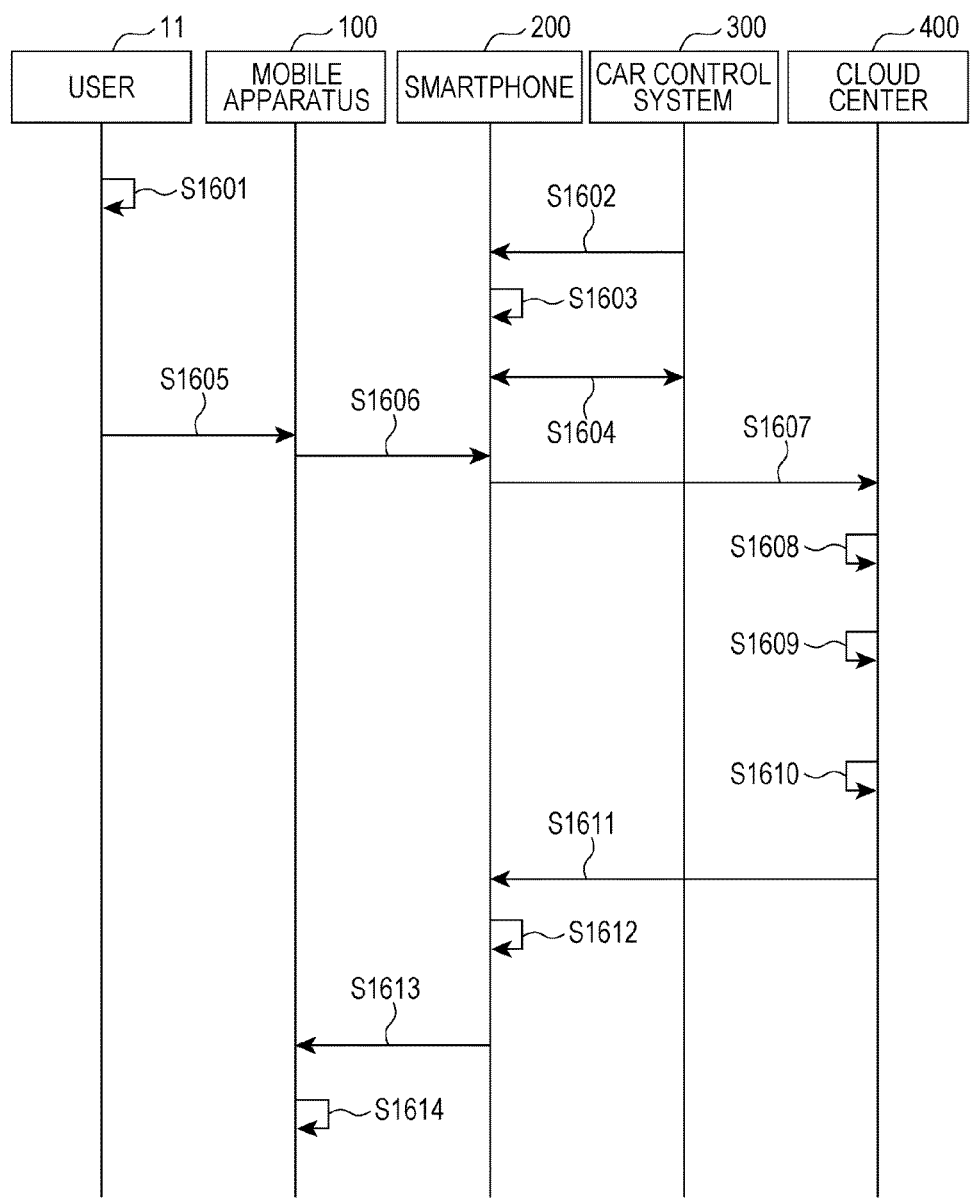
FIG. 16 is a sequence diagram schematically illustrating an example of the operation of the information acquisition system illustrated in FIG. 1.
Figure 17:
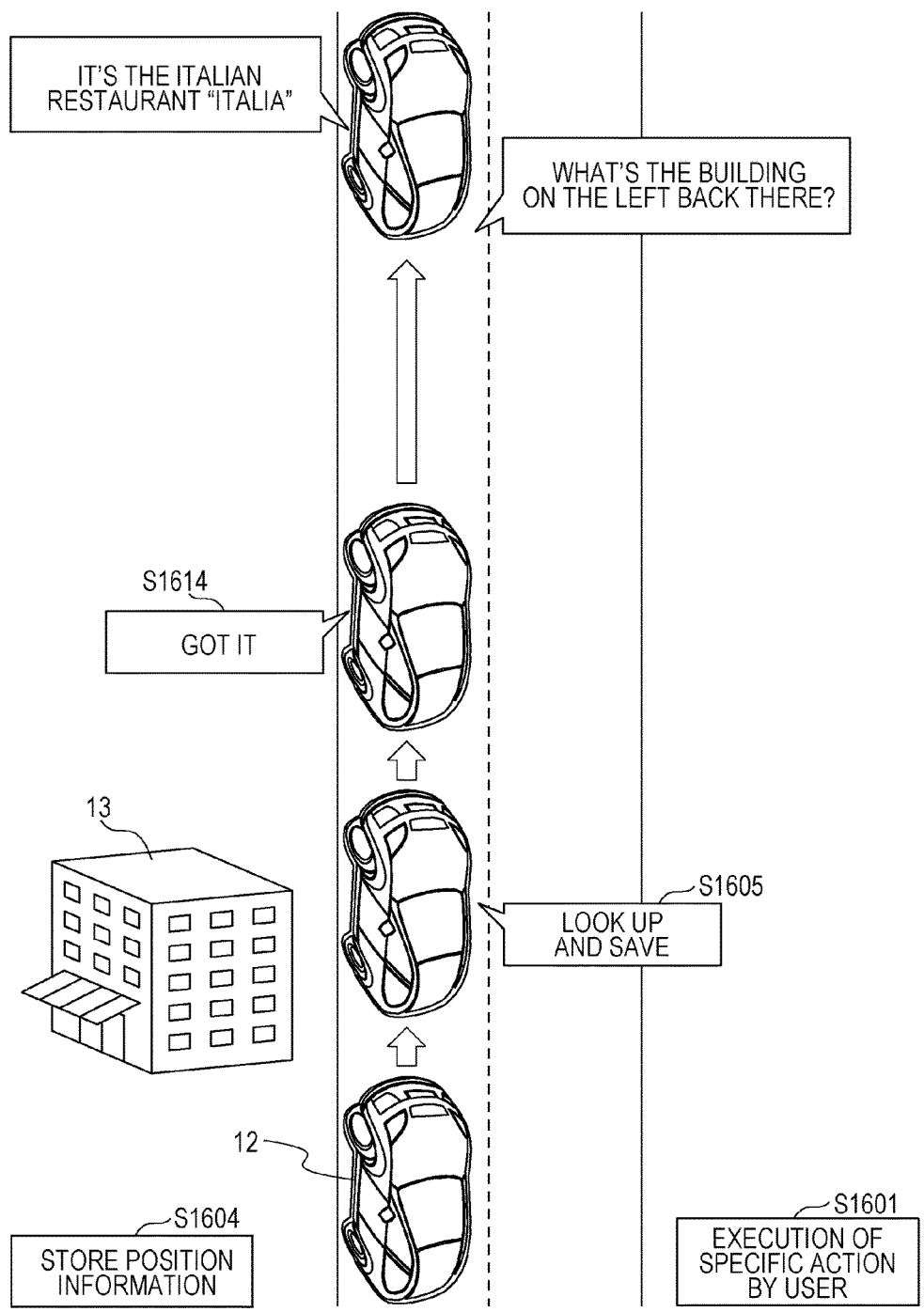
FIG. 17 is a diagram schematically illustrating a situation in which the operation of FIG. 16 is performed.

FIG. 16 is a sequence diagram schematically illustrating an example of the operation of the information acquisition system 1 illustrated in FIG. 1. FIG. 17 is a diagram schematically illustrating a situation in which the operation of FIG. 16 is performed. The operation in FIG. 16 is performed when the user 11 is driving and traveling in the car 12, as illustrated in FIG. 17.

The user 11, seeing a place 13 on the roadside while driving the car 12, performs the specific action in S1601. In S1602, the specific action performed by the user 11 is detected by the car control system 300 (an example of a detecting step). Subsequently, the detection information is transmitted from the controller 301 of the car control system 300 to the controller 201 of the smartphone 200.

When the user 11 performs an action of moving his or her arm at a speed of a designated value or more as the specific action, the action is detected by the motion sensor 316 of the car control system 300. When the user 11 performs an action of stepping on the brake pedal 14 with a depression of a designated value or more as the specific action, the action is detected by the brake sensor 317 of the car control system 300.

When the user 11 performs an action of moving his or her gaze by a designated angle or more as the specific action, the action is detected by the gaze sensor 315 of the car control system 300. In this case, the controller 301 of the car control system 300 transmits, to the smartphone 200, detection information that includes gaze information including the direction and height of the gaze of the user 11 detected by the gaze sensor 315. The controller 201 of the smartphone 200 saves the gaze information transmitted from the car control system 300 in the non-volatile memory 209.

In S1603, the controller 201 of the smartphone 200 acquires and saves the current time in the non-volatile memory 209. In S1604 (an example of a first saving step), the controller 201 of the smartphone 200 (an example of a saving controller) acquires and saves position information in association with the current time in the non-volatile memory 209 (an example of a storage unit). In the operation of FIG. 16, in S1604, the controller 201 of the smartphone 200 requests position information from the car control system 300, and acquires, from the car control system 300, position information detected by the GPS module 311 of the car control system 300.

Note that when gaze information is saved in the non-volatile memory 209 in S1602, the controller 201 saves the current time in association with the gaze information in the non-volatile memory 209 in S1603, and saves position information in association with the gaze information in the non-volatile memory 209 in S1604 (an example of a first saving step).

In S1605, the user 11 speaks the voice phrase "Look up and save", for example, as illustrated in FIG. 17. In S1606, the mobile apparatus 100 transmits a PCM voice signal obtained from the voice of the user 11 acquired by the microphone 102 to the smartphone 200.

In S1607, the controller 201 of the smartphone 200 transmits the voice processing request signal 600 (FIG. 6) to the cloud center 400.

In S1608, the cloud server 401 of the cloud center 400 uses the voice control DB 403 to perform a voice recognition process on the speech data 606 included in the voice processing request signal 600 (an example of a voice recognizing step). Also, the cloud server 401 uses the specific voice phrase correspondence table 800 (FIG. 8) to analyze the intent of the user 11.

Herein, since the voice phrase spoken by the user 11 is "Look up and save", the cloud server 401 first searches for a place in response to "Look up", on the basis of the specific voice phrase correspondence table 800. In other words, in S1609, the cloud server 401 decides a search range in the map DB 408 from the gaze information 613 included in the voice processing request signal 600. Additionally, the cloud server 401 searches the restaurant DB 405, the hotel DB 406, and the recreational facilities DB 407, and extracts information about places included in the search range in the map DB 408 (an example of a searching step).

Next, in S1610, since the voice phrase spoken by the user 11 is "Look up and save", the cloud server 401 generates clip information 1300 in response to "save", on the basis of the specific voice phrase correspondence table 800. The cloud server 401 generates the clip information 1300 from the information included in the voice processing request signal 600 transmitted from the smartphone 200 in S1607, and the place information obtained in S1609. The cloud server 401 saves the generated clip information 1300 in the clip information DB 404 (an example of a second saving step).

In S1611, the cloud server 401 transmits a response table 900 (FIG. 9) including the control command 911 and the control data 912 to the smartphone 200. In S1612, the controller 201 of the smartphone 200 determines the content of the received control command.

In the example of FIG. 9, "Text-to-speech" is included in the control command 911, and thus in S1613, the controller 201 of the smartphone 200 transmits the control data 912 to the mobile apparatus 100. In S1614, the speaker 103 of the mobile apparatus 100, on the basis of the control data 912, outputs the voice phrase "Got it" as illustrated in FIG. 17.

After that, as illustrated in FIG. 17, if the user 11 asks "What's the building on the left back there?", the cloud server 401 may perform a voice recognition process, and then respond with "It's the Italian restaurant 'Italia'" from the speaker 103 of the mobile apparatus 100.

(Modifications of Operation in FIG. 16)

(1) When the specific action in S1601 is an action of moving one's arm at an acceleration of a designated value or more, and the acceleration sensor 107 of the mobile apparatus 100 detects the action in S1602, the controller 101 of the mobile apparatus 100 may transmit detection information to the controller 201 of the smartphone 200.

(2) In S1604, the controller 201 of the smartphone 200 acquires position information from the car control system 300, but may also acquire position information detected by the GPS module 211.

(3) In S1606, the controller 201 of the smartphone 200 acquires a voice signal of the user 11 from the mobile apparatus 100, but may also acquire a voice signal of the user 11 from the microphone 202.

(4) In S1609, the cloud server 401 decides a search range from the gaze information 613 included in the voice processing request signal 600, but the present disclosure is not limited thereto. As a result of the voice recognition process in S1608, when a word indicating a direction is included in the voice phrase spoken by the user 11, such as in "What's the building on the right?", for example, the cloud server 401 may also refine the search range to that direction.

(5) In S1612, if the controller 201 of the smartphone 200 is unable to determine the content of the received control command, the controller 201 may also perform a predetermined error process.

(6) In S1614, a voiced response is output from the speaker 103 of the mobile apparatus 100, but voice may also be output from the speaker 203 of the smartphone 200, or voice may be output from the speaker 303 of the car control system 300.

(7) As a result of the voice recognition process in S1608, if the voice phrase spoken by the user 11 is not a voice phrase corresponding to "Search for place" or a voice phrase corresponding to "Save clip information" in the specific voice phrase correspondence table 800, but instead is the voice phrase "Make a phone call", for example, the cloud server 401 may not execute S1609 and S1610. In this case, in S1611, the cloud server 401 may also transmit to the controller 201 of the smartphone 200 a control command including an instruction to delete the position information from the non-volatile memory 209. In S1612, the controller 201 of the smartphone 200 may delete the position information from the non-volatile memory 209 (an example of a second deleting step).

(Example Operation Different from FIG. 16)

Figure 18:
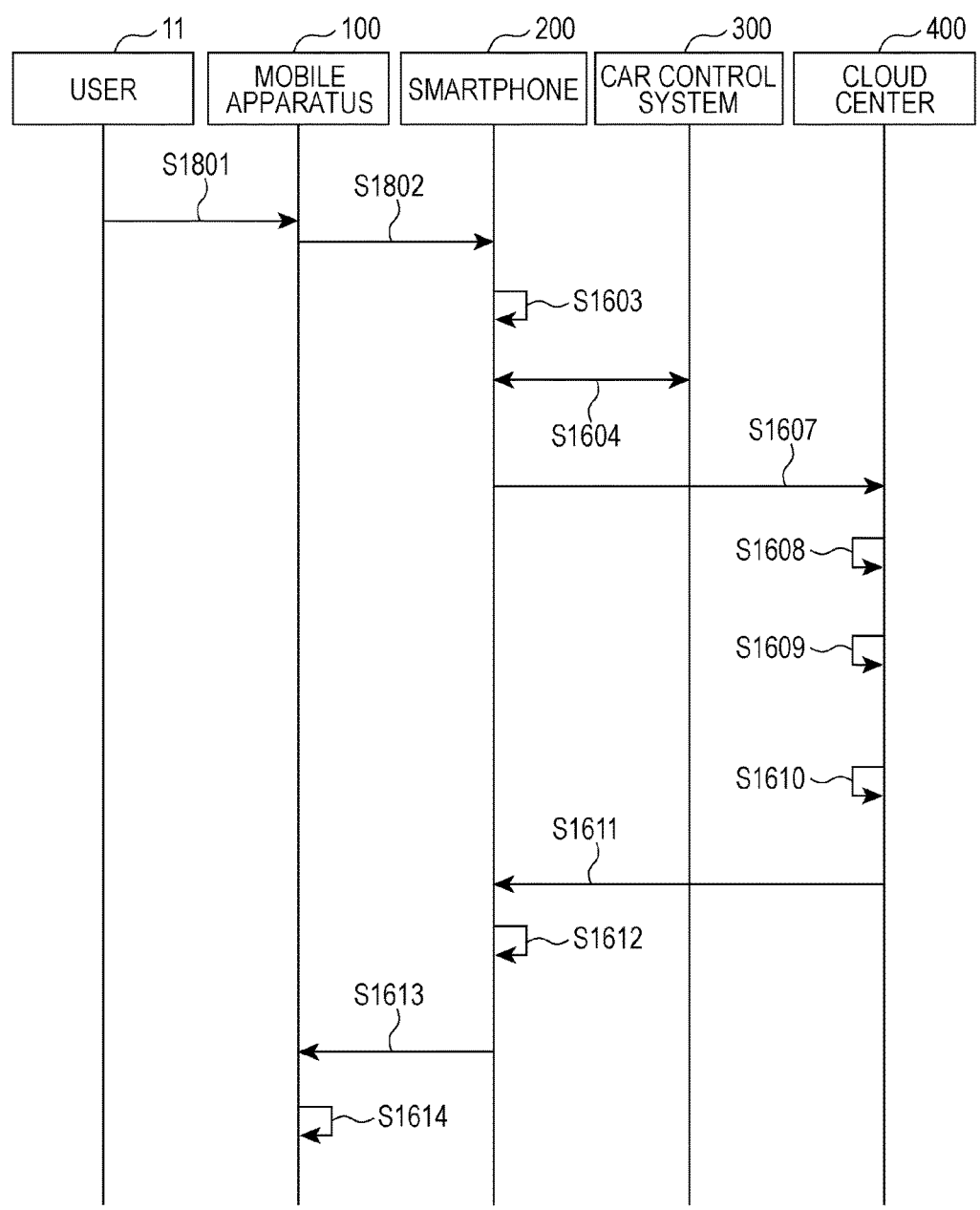
FIG. 18 is a sequence diagram schematically illustrating an example, different from FIG. 16, of the operation of the information acquisition system illustrated in FIG. 1.

FIG. 18 is a sequence diagram schematically illustrating an example, different from FIG. 16, of the operation of the information acquisition system 1 illustrated in FIG. 1. The operation in FIG. 18 is likewise performed when the user 11 is driving and traveling in the car 12, as illustrated in FIG. 17.

The user 11, seeing a place 13 on the roadside while driving the car 12, speaks the voice phrase "Look up and save", for example, as the specific action in S1801. In S1802, the controller 101 of the mobile apparatus 100 detects that the signal picked up by the microphone 102 is a voice phrase spoken by the user 11 (an example of a detecting step). Subsequently, the controller 101 transmits a PCM voice signal obtained from the voice of the user 11 to the smartphone 200 as detection information.

S1603, S1604, and S1607 to S1614 are the same as S1603, S1604, and S1607 to S1614 in FIG. 16, respectively.

Note that in S1802, the controller 201 of the smartphone 200 acquires a voice signal of the user 11 from the mobile apparatus 100, but may also acquire a voice signal of the user 11 directly from the microphone 202.

(Operation of Smartphone)

Figure 19:
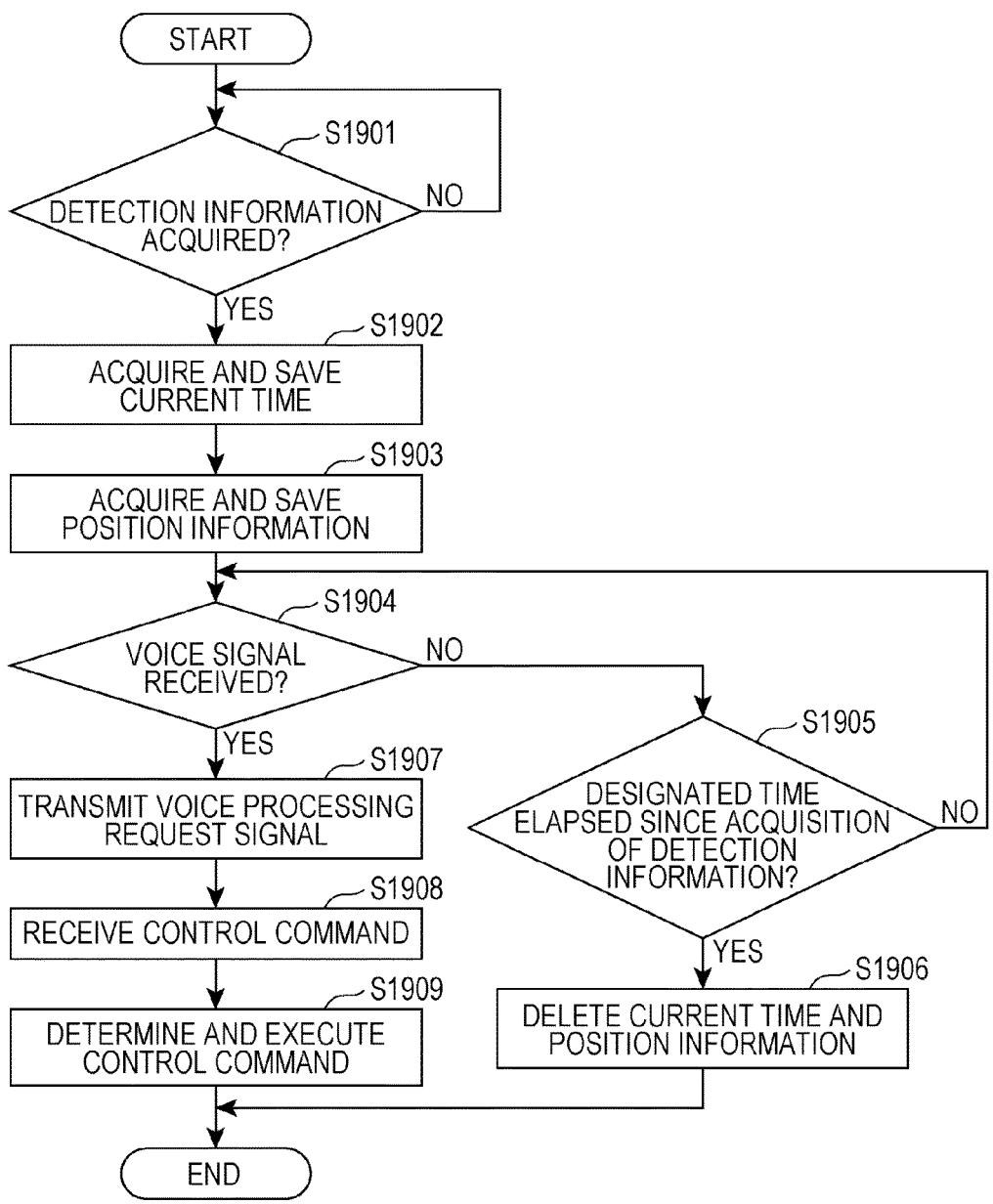
FIG. 19 is a flowchart schematically illustrating an operating procedure of a controller of a smartphone in the operation of FIGS. 16 and 18.

FIG. 19 is a flowchart schematically illustrating an operating procedure of the controller 201 of the smartphone 200 in the operation of FIGS. 16 and 18.

In S1901, the controller 201 first judges whether or not detection information was acquired from the car control system 300 or the mobile apparatus 100 (an example of a detecting step). If the detection information has not been acquired (S1901, NO), the controller 201 repeats the determination in S1901.

After detection information is acquired (S1901, YES), in S1902, the controller 201 acquires and saves the current time in the non-volatile memory 209. In S1903, the controller 201 acquires and saves position information in association with the current time in the non-volatile memory 209 (an example of a first saving step). In S1903, the controller 201 may also acquire position information from the car control system 300, or acquire position information detected by the GPS module 211.

Note that when detection information is acquired in S1901 (S1901, YES), if gaze information is included in the acquired detection information, the controller 201 saves the acquired gaze information in the non-volatile memory 209, as described using FIG. 16. In this case, in S1902, the controller 201 saves the current time in association with the gaze information in the non-volatile memory 209. Also, in S1903 (an example of the first saving step), the controller 201 saves the position information in association with the gaze information in the non-volatile memory 209.

In S1904, the controller 201 judges whether or not a voice signal of a voice phrase spoken by the user 11 was received. If a voice signal has not been received (S1904, NO), in S1905, the controller 201 judges whether or not a designated time has elapsed since the time at which the detection information was acquired in S1901. If the designated time has not elapsed (S1905, NO), the process returns to S1904. Note that in the present embodiment, the time at which the gaze sensor 315 or the like detects the specific action performed by the user 11 and the time at which the controller 201 acquires detection information in S1901 are treated as being in agreement.

If the designated time has elapsed since the time at which detection information was acquired in S1901 (S1905, YES), in S1906, the controller 201 (an example of a deletion controller) deletes the current time and the position information saved in S1902 and S1903 from the non-volatile memory 209 (an example of a first deleting step). In other words, if a voice signal has not been received even though the designated time has elapsed since the time at which detection information was acquired in S1901, the controller 201 deletes the current time and the position information saved in the non-volatile memory 209.

Note that if gaze information is saved in the non-volatile memory 209 in S1901, the controller 201 also deletes the gaze information in S1906 when deleting the current time and the position information from the non-volatile memory 209.

On the other hand, if a voice signal is received (S1904, YES), in S1907, the controller 201 transmits the voice processing request signal 600 (FIG. 6) to the cloud center 400.

In S1908, the controller 201 receives a control command from the cloud center 400. In S1909, the controller 201 determines the content of the control command, and executes the control command according to the determination result.

In the case in which FIG. 19 expresses the operating procedure in the operation of FIG. 16, a judgment of NO is returned in S1904 of FIG. 19 until a voice signal is received in S1606 of FIG. 16. When a voice signal is received in S1606 of FIG. 16, a judgment of YES is returned in S1904 of FIG. 19. As a result, the state of the current time and the position information being saved in the non-volatile memory 209 is maintained.

In the case in which FIG. 19 expresses the operating procedure in the operation of FIG. 18, a voice signal is received in S1802 of FIG. 18, and thus a judgment of YES is returned in S1904 of FIG. 19 without ever returning a judgment of NO. As a result, the state of the current time and the position information being saved in the non-volatile memory 209 is maintained.

Note that in the present embodiment, the smartphone 200 executes the operation in FIG. 19, but the present disclosure is not limited thereto. For example, another apparatus such as the mobile apparatus 100 may also execute the operation in FIG. 19.

Advantageous Effects

As described above, in the present embodiment, when a gaze sensor 315 of the car control system 300 or the like detects a specific action performed by the user 11, the controller 201 of the smartphone 200 acquires and saves position information in the non-volatile memory 209. Consequently, since the system does not stand by until a result of the voice recognition process is obtained, the position information desired by the user 11 may be acquired appropriately.

(Other)

(1) In FIG. 1, a configuration is also conceivable in which the car control system 300 is connected to a cloud center of the car manufacturer, and all detection data from each sensor of the car control system 300, such as the gaze sensor 315, is transmitted to the cloud center of the car manufacturer. In the case of this configuration, it is sufficient for the smartphone 200 or the cloud center 400 of the information acquisition system 1 to acquire the detection data of each sensor of the car control system 300 from the cloud center of the car manufacturer.

(2) During the initial setup of the smartphone 200, information such as the age, height, eyesight, and use of glasses or not may also be input. By using such information, the detection accuracy of a gaze direction by the gaze sensor 315 may be improved.

(3) The car control system 300 according to the foregoing embodiment is equipped with the gaze sensor 315, but the present disclosure is not limited thereto. Alternatively, the car control system 300 may not be equipped with the gaze sensor 315. When the car control system 300 is not equipped with the gaze sensor 315, the voice processing request signal 600 (FIG. 6) does not include the gaze information 613. In this case, the cloud server 401 may decide a search range centered on the car's direction of travel, according to the car's speed, as illustrated in FIG. 11. In other words, the cloud server 401 may decide a search range according to the direction of a gaze as illustrated in FIG. 12, but only in the case in which the car control system 300 is equipped with the gaze sensor 315, and the voice processing request signal 600 (FIG. 6) includes the gaze information 613.

An information acquisition method, information acquisition system, and information acquisition program according to the present disclosure may be utilized in technology for acquiring information related to places on the roadside noticed by a user while traveling in a car.

What is claimed is:

1. An information acquisition method in an information acquisition system including an information device possessed by a user, the information acquisition method comprising:

detecting a specific action performed by the user while driving a motor vehicle;

acquiring and saving, in a non-transitory recording medium, motor vehicle position information indicating a position of the motor vehicle if the specific action is detected by the detecting; and deleting the motor vehicle position information from the non-transitory recording medium when a designated time elapses in a case in which the specific action is an action other than an action of speaking a voice phrase, and in a case in which the user does not perform an action of speaking a voice phrase from a time at which the specific action was detected and before the designated time elapses.

2. The information acquisition method according to claim 1, wherein the detecting detects gaze information related to a gaze direction of the user, and detects an action of the user moving his or her gaze by a designated angle or more as the specific action.

3. The information acquisition method according to claim 2, wherein the acquiring and saving saves the motor vehicle position information and the gaze information in association with each other in the non-transitory recording medium, and the deleting also deletes the gaze information in a case of deleting the motor vehicle position information from the non-transitory recording medium.

4. The information acquisition method according to claim 1, wherein the detecting detects an action of the user moving his or her arm at a speed or an acceleration of a designated value or more as the specific action.

5. The information acquisition method according to claim 1, wherein the detecting detects an action of the user stepping on a brake pedal of the motor vehicle by a designated value or more as the specific action.

6. The information acquisition method according to claim 1, wherein the detecting detects an action of the user speaking a voice phrase as the specific action.

7. The information acquisition method according to claim 1, wherein the information acquisition system additionally includes a server device, the server device includes a search function that uses map information to search for information related to a place, and a voice recognition function that recognizes content of a voice phrase spoken by the user, and the information device communicates with the server device, the information acquisition method further comprising recognizing content of a voice phrase spoken by the user in a case in which the specific action is an action of speaking a voice phrase, or a case in which the specific action is an action other than an action of speaking a voice phrase, but the user performs an action of speaking a voice phrase from a time at which the specific action was detected and before the designated time elapses; and using the map information to search for information related to a place established in a vicinity of a position corresponding to the motor vehicle position information saved in the non-transitory recording medium if the recognizing content judges that the voice phrase spoken by the user includes a specific search-related voice phrase.

8. The information acquisition method according to claim 7, further comprising:
generating and saving, in the server device, clip information including the motor vehicle position information and the information related to a place found by the searching step if the recognizing content judges that the voice phrase spoken by the user includes a specific save-related voice phrase.

9. The information acquisition method according to claim 8,
wherein the deleting deletes the motor vehicle position information saved in the non-transitory recording medium from the non-transitory recording medium if the voice recognizing step judges that the voice phrase spoken by the user includes neither the specific search-related voice phrase nor the specific save-related voice phrase.

10. A system comprising:
a processor;
a first non-transitory recording medium for storing motor vehicle position information which indicates a position of a motor vehicle;
a sensor detecting a specific action by a user while driving the motor vehicle; and
a second non-transitory recording medium having a computer program, the computer program causing the processor to execute operations operable to
acquire and save the motor vehicle position information in the first non-transitory recording medium if the specific action is detected by the sensor, and
delete the motor vehicle position information from the first non-transitory recording medium when a designated time elapses in a case in which the specific action is an action other than an action of speaking a voice phrase, and in a case in which the user does not perform an action of speaking a voice phrase from a time at which the specific action was detected and before the designated time elapses.

11. The system according to claim 10,
wherein the first non-transitory recording medium and the second non-transitory recording medium are the same non-transitory recording medium.

12. A non-transitory recording medium having an information acquisition computer program used in an information acquisition system including an information device possessed by a user, the computer program causing a processor of the information acquisition system to execute operations operable to:
detect a specific action performed by the user while driving a motor vehicle;
acquire and save motor vehicle position information expressing a position of the motor vehicle in a non-transitory recording medium for the motor vehicle position information if the specific action is detected; and
delete the motor vehicle position information from the non-transitory recording medium for the motor vehicle position information when a designated time elapses in a case in which the specific action is an action other than an action of speaking a voice phrase, and in a case in which the user does not perform an action of speaking a voice phrase from a time at which the specific action was detected and before the designated time elapses.

13. The non-transitory recording medium according to claim 12,
wherein the non-transitory recording medium for the motor vehicle position information and the non-transitory recording medium are the same non-transitory recording medium.

\* \* \* \* \*